United States Patent Office 2,947,777
Patented Aug. 2, 1960

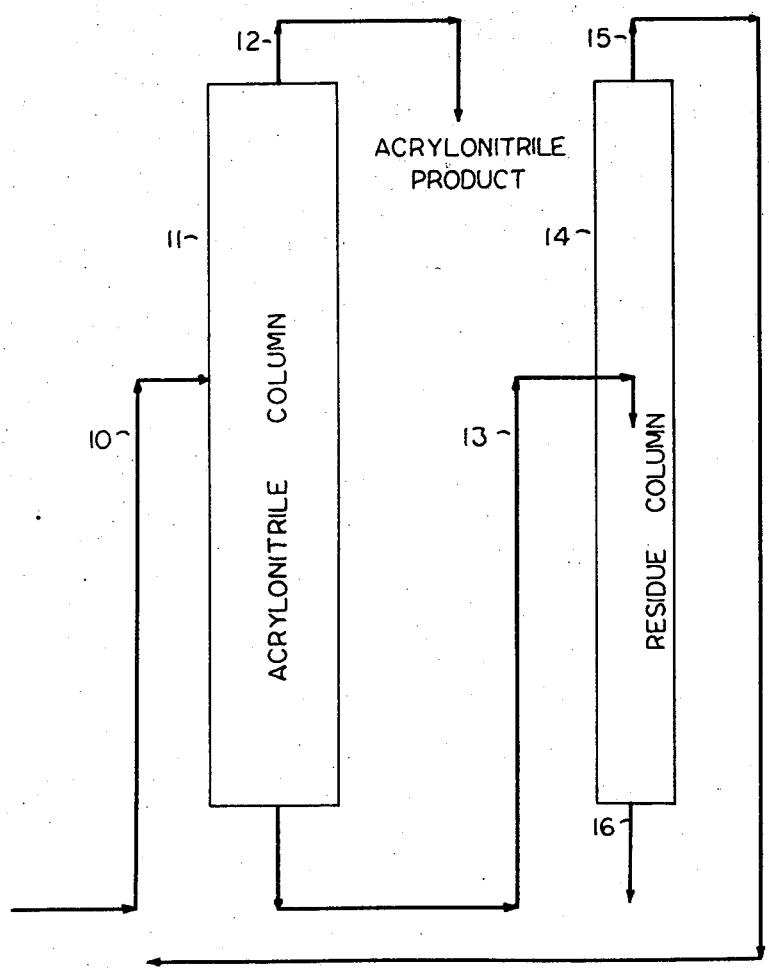

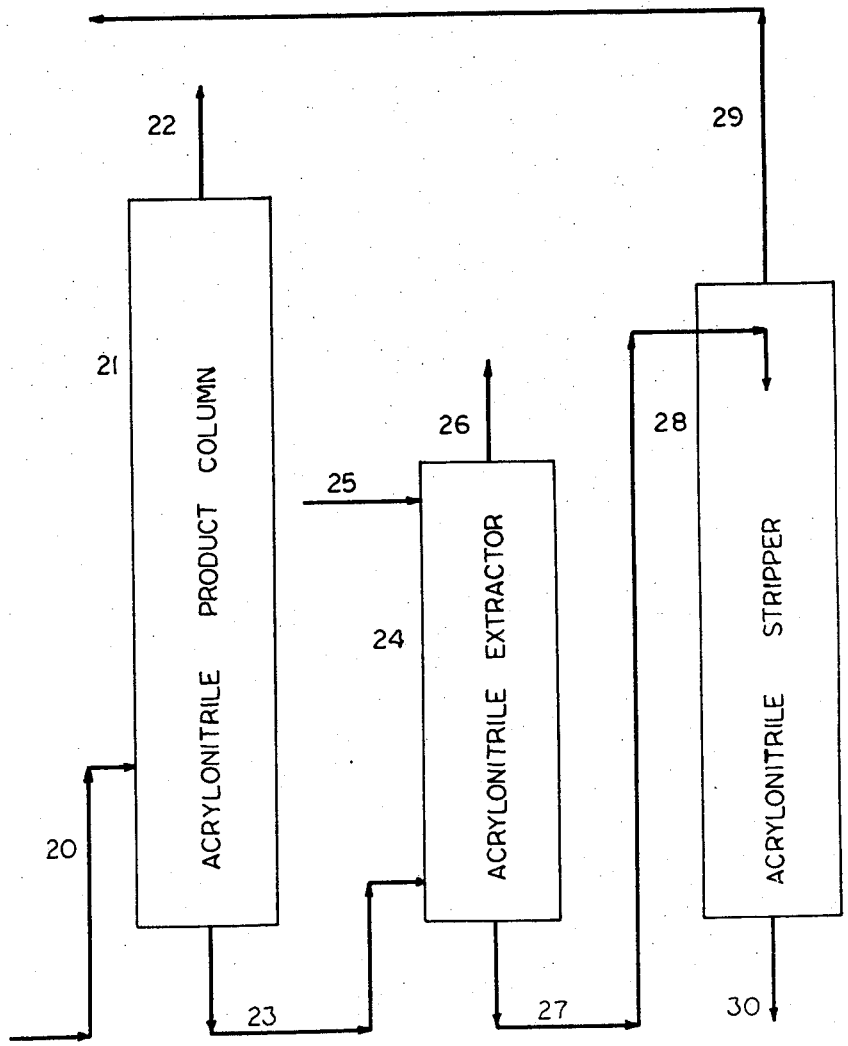

2,947,777

PURIFICATION OF ACRYLONITRILE

Gordon H. Lovett, Texas City, Tex., assignor to Monsanto Chemical Company, St. Louis, Mo., a corporation of Delaware Filed Nov. 26, 1957, Ser. No. 699,083

3 Claims. (Cl. 260—465.9)

This invention relates to the purification of acrylonitrile. More particularly, it relates to an improved method for separating and recovering cyanobutadiene from acrylonitrile and to more efficient recovery of acrylonitrile from a distillation system wherein it is purified or refined from crude acrylonitrile.

The acrylonitrile obtained from the reaction of hydrocyanic acid and acetylene in the presence of an aqueous acidic cuprous chloride catalyst solution (Nieuwland catalyst) is contaminated with impurities which must be removed from the acrylonitrile to obtain a product of the requisite purity for polymerization purposes. The organic impurities present in the crude acrylonitrile product include unreacted feed materials (acetylene and hydrocyanic acid) acetylene polymers (vinylacetylene, divinylacetylene) acetaldehyde, lactonitrile, chlorobutadiene and cyanobutadiene. The by-products obtained may be divided into two classes according to their solubility in water—those components which are much less soluble than acrylonitrile (chlorobutadiene, vinylacetylene and divinylacetylene) and those components which have solubilities of the same order of magnitude or greater than the solubility of acrylonitrile in water (lactonitrile, acetaldehyde, hydrocyanic acid, and cyanobutadiene). In the typical prior art process, recovery of the acrylonitrile involves the absorption of the acrylonitrile and soluble impurities from the reactor effluent gas directly into water to form a dilute (1–2%) solution of acrylonitrile. Thereafter, this impure stream is contacted with a gas, such as a stream of steam, nitrogen, or gaseous acetylene whereby monovinylacetylene, divinylacetylene, and chlorobutadiene are stripped from the water solution. The solution is then steam-stripped and distilled in one or more fractionating columns. Product acrylonitrile is recovered overhead from a product or finishing column while the high-boiling impurities such as lactonitrile and cyanobutadiene are passed out the bottom of this column.

The bottoms stream from the product acrylonitrile column in such a purification system contains a considerable quantity of acrylonitrile, too much acrylonitrile, in fact, to be sent to waste without resulting in large losses and, consequently, a highly inefficient process. It is, therefore, generally processed further by vacuum distillation in a so-called residue column. A diagrammatic flowsheet of the finishing end of such a conventional process is presented in Figure 1. Acrylonitrile essentially freed of low-boiling impurities such as acetylene polymers, chlorobutadiene, and acetaldehyde and containing as impurities relatively small quantities of lactonitrile, cyanobutadiene and water is introduced through line 10 into a conventional fractionating column 11 wherein it is fractionally distilled to produce pure acrylonitrile which is taken overhead through line 12 and collected in storage tanks (not shown). The bottoms from column 11 consisting of approximately 50% acrylonitrile and 50% higher boiling impurities (predominantly lactonitrile 40% and cyanobutadiene 10%) is withdrawn through line 13 and introduced into the residue column 14. In this column, which is usually operated under vacuum to prevent decomposition of the lactonitrile present, acrylonitrile containing some lactonitrile is distilled overhead through line 15 and recycled to one of the earlier distillation columns in the purification train, usually the one just preceding the product column. The bottoms or residue stream containing mostly lactonitrile and cyanobutadiene but some acrylonitrile also is withdrawn through line 16 and disposed of as waste.

Practical experience has shown that the finishing process outlined just above generally provides for only about 50% to 80% recovery of the acrylonitrile in the bottoms stream from the product column 11. Data collected from the operation of such a purification system over a period of time demonstrate that 12 lb. of acrylonitrile per hour out of the 62 lb. per hour in the bottoms stream made with every 1000 lb. per hour of substantially pure acrylonitrile produced per hour is lost in the bottoms from the residue column. Theoretically, it should be possible to effect complete recovery of the acrylonitrile by recycle of the bottoms stream from the product or finishing column to one of the previous fractionating columns. Actually, this cannot be done effectively because of the net make or build-up of cyanobutadiene in the system. Provision must be made for control of this impurity and recycle does not provide the answer. In addition, polymerization of cyanobutadiene in the residue column causes plugging and necessitates frequent shut-downs for removal of polymer and cleaning of the equipment.

It has now been discovered that these problems can be obviated by subjecting the bottoms from the acrylonitrile product column to extraction with water and thereafter stripping the water extract of acrylonitrile thus obtained to recover acrylonitrile suitable for recycle in the purification system. The relative solubilities and volatilities of acrylonitrile, lactonitrile, and cyanobutadiene make this liquid-liquid extraction technique efficient enough to remove essentially all the cyanobutadiene from the recycle stream, and provide for better than 90% recovery of the acrylonitrile as compared to the 50%–80% ordinarily achieved with the conventional processes. In addition to obviating the difficulties attributable to polymerization of cyanobutadiene in the usual distillation train, the process of the invention provides a source of this compound which is itself useful as a monomer and comonomer in the production of useful plastic materials.

It is a primary object of the invention to provide a continuous method for refining acrylonitrile to produce a product of high purity.

It is a further object of the invention to provide a continuous purification process for crude acrylonitrile wherein cyanobutadiene is recovered as a by-product and polymerization of cyanobutadiene during the purification procedure is thus reduced to a minimum and consequently more efficiency in operation is achieved in view of the less frequent dismantling of equipment for cleaning necessitated by polymer build-up.

A still further object of the invention is to effect maximum recovery of acrylonitrile in the purification of a crude acrylonitrile stream containing as impurities lactonitrile and cyanobutadiene.

These and other objects of the invention will become more apparent from a study of the following specification in conjunction with the accompanying Figure 2 which is a diagrammatic flowsheet of the method of the invention. Column 21 is a conventional fractionating column which is the finishing or product column in a distillation train for purifying crude acrylonitrile made by the reaction of acetylene and hydrogen cyanide. After removal of impurities such as monovinylacetylene, divinylacetylene, chlorobutadiene and acetaldehyde, acrylonitrile containing lactonitrile and cyanobutadiene as the major impurities is introduced through line 20 into the product column 21 containing conventional packing or bubble caps to obtain essentially pure acrylonitrile which is withdrawn overhead through line 22 and collected in storage tanks or other facilities (not shown). The bottoms stream from column 21 containing anywhere from 35–80% by weight acrylonitrile, 15–25% of lactonitrile and 10 to 20% cyanobutadiene together with minor amounts of other organics is withdrawn through line 23 and introduced into the bottom of an extractor 24 into which water is introduced at the top through line 25. Any type of extractor may be used which provides for good liquid-liquid contact. A column packed with Raschig rings or the like is suitable. However, an extractor of the rotating-disc type is preferred because of the higher efficiency which can be obtained with this type of equipment. The extractor is operated at atmospheric pressure. The temperature of the incoming acrylonitrile-containing stream is in the range from about 30 to 60° C. while the water added has a temperature in the range from about 25 to about 35° C. As the bottoms stream from column 21 moves upward through the descending water, acrylonitrile and lactonitrile are dissolved in the water while the major portion of the cyanobutadiene remains undissolved and collects as the organic phase at the top of the extractor. An organic stream containing predominantly cyanobutadiene is continuously removed overhead through line 26 while an aqueous solution containing acrylonitrile and lactonitrile is withdrawn from the bottom through line 27. The aqueous solution from the extractor 24 is introduced into the top of fractionating column 28 where it is stripped of acrylonitrile. This operation may be a conventional fractional distillation or it may be effected by means of steam in which case steam is introduced into the bottom of the column. Acrylonitrile containing only a trace of lactonitrile and very small amounts of cyanobutadiene is withdrawn overhead through line 29 from column 28 and recycled to any one of several points in the distillation purification train preceding the product column 21. Preferably, this stream is recycled to the so-called light-ends column, the distillation column just ahead of the product column where removal of acetaldehyde is effected. The bottoms from the stripping column consisting essentially of an aqueous solution of lactonitrile is removed through line 30 and sent to waste or stored for subsequent use.

The invention is illustrated in the following example which, however, is not to be construed as limiting it in any manner except as it is limited in the appended claims.

*Example I*

A pilot plant unit consisting of a rotating-disc extractor and a stripping or fractionating column with all the necessary accessory receivers, condensers, pumps, valves, etc., was set up in the manner of the extractor 24 and stripping column 28 of Figure 2. The extractor column (20 ft. x 6 in.) had an effective extraction zone of 15 ft. maximum which was divided into 61 compartments each 3 in. in height. The compartments consisted of one rotating disc centered between two stator rings or baffles. The unit was driven by a 1 H.P., U.S. Varidrive with an explosion-proof motor capable of giving from 80 to 1300 r.p.m. The effective length of the extraction zone could be regulated by simply raising or lowering the organic feed inlet. The top 2.16 ft. of the column served as a coalescing section for the organic phase while the bottom 2.1 ft. acted as a de-entrainment zone.

The stripping column was 95 cm. long and 2.5 cm. in inside diameter. It was a double-jacketed column being enclosed within a glass jacket which was in turn enclosed in another glass jacket to provide the necessary insulation.

An inlet for steam was provided at the bottom of the column just above the still or reboiler. The top of the column contained a feed inlet, a thermowell extending 10 in. down into the packing of glass beads, and a connection to a water-cooled condenser and graduated receiver for the material passing overhead.

A series of runs was made in this unit to determine the effectiveness of the extraction technique. Typical of such runs is the following: A stream of acrylonitrile coming from the bottom of a plant fractionating column equivalent to column 21 in Figure 2 wherein a crude acrylonitrile had been concentrated and separated from lower-boiling impurities was fed into the bottom of the rotating-disc extractor at a rate of 40 lb. per hr. while water was introduced into the top of the extractor at a rate of 536 lb. per hour. An effective extraction height of 8 ft. was used and the rotor speed was 200 r.p.m. Pressure was atmospheric and the temperature of the entering crude acrylonitrile was approximately 50° C. while that of the water was 25° C. Liquid level in the extractor was maintained at a given height by means of a liquid leg attached to the column. The organic phase collected at the top of the column was withdrawn overhead while the water solution was withdrawn from the bottom. The entering feed, the extractor overhead, and the extractor bottoms were all analyzed for acrylonitrile, cyanobutadiene, and lactonitrile. Results are tabulated below. All values given are in percent by weight.

|  | Feed | Extractor Overhead | Extractor Bottom |
|---|---|---|---|
| Acrylonitrile | 74.5 | 13.1 | 4.05 |
| Cyanobutadiene | 6.1 | 75.0 | 0.30 |
| Lactonitrile | 6.39 | 0.0 | 0.12 |

These data demonstrate that the bulk of the cyanobutadiene present in the feed is readily separated from acrylonitrile in the extractor and taken overhead.

The bottoms from the extractor was fed through a calibrated rotameter into the top of the stripping column while steam was admitted at the bottom of the column, passing upward through the packing and the descending aqueous solution and serving to strip acrylonitrile from it. The overhead was removed continuously and the bottoms was removed periodically by siphoning from the still. Both streams were collected, weighed and analyzed for acrylonitrile, cyanobutadiene and lactonitrile. Results are presented below with values given in weight percent.

|  | Stripper Feed | Stripper Overhead | Stripper Bottoms |
|---|---|---|---|
| Acrylonitrile | 4.05 | 98.7 | 0.02 |
| Cyanobutadiene | 0.30 | 0.07 | 0.03 |
| Lactonitrile | 0.12 | 1.02 | 0.12 |

From the 567 g. of extractor bottoms containing approximately 23 g. of acrylonitrile fed to the stripper, 22.85 g. of acrylonitrile or 99.5% by wt. was recovered in the stripper overhead and only 0.5% by wt. was lost in the stripper bottoms.

Based upon the data collected in this and the other similar runs, it can be shown that using the purification process of the invention only one lb. of acrylonitrile per hour of the 62 lb. per hour in the bottoms stream from the product distillation column made for every 1000 lb. of product acrylonitrile produced per hour is lost to waste or residue. This means that on a percentage basis only 0.1% of the acrylonitrile make is lost in processing in the improved process of the invention, whereas in the conventional method, the loss of acrylonitrile on a comparative basis is 1.2%. Thus, the present process provides for a better than 10% increase in efficiency of recovery of acrylonitrile. In addition, it provides a source of cyanobutadiene of relatively high purity by means of a simple operational step. Prior art processes wherein this monomer is recovered involve solvent extraction and stripping from the solvent with all the attendant problems of solvent clean-up.

What is claimed is:

1. In the process of refining a crude acrylonitrile, produced by the reaction of acetylene and HCN, wherein said crude acrylonitrile is subjected to fractional distillation in a series of separate distillation zones to separate the various impurities therefrom and wherein substantially pure acrylonitrile is withdrawn overhead while a stream consisting essentially of acrylonitrile, lactonitrile, and cyanobutadiene is withdrawn from the bottom of one of said distillation zones, the improvement which comprises contacting said bottoms stream with water to extract acrylonitrile and lactonitrile therefrom, recovering a stream of cyanobutadiene as the organic phase from said extraction, withdrawing the aqueous solution of acrylonitrile and lactonitrile, subjecting said aqueous solution to fractionation in a distillation zone to obtain acrylonitrile as the overhead product and an aqueous solution of lactonitrile as the bottoms from said distillation zone.

2. In the process of refining a crude acrylonitrile, produced by the reaction of acetylene and HCN, wherein said crude acrylonitrile is subjected to fractional distillation in a series of separate distillation zones to separate the various impurities therefrom and wherein substantially pure acrylonitrile is withdrawn overhead while a stream consisting essentially of acrylonitrile, lactonitrile, and cyanobutadiene is withdrawn from the bottom of one of said distillation zones, the improvement which comprises contacting said bottoms stream with water to extract acrylonitrile and lactonitrile therefrom, recovering a stream of cyanobutadiene as the organic phase from said extraction, withdrawing the aqueous solution of acrylonitrile and lactonitrile, subjecting said aqueous solution to fractionation in a distillation zone to obtain acrylonitrile as the overhead product and an aqueous solution of lactonitrile as the bottoms from said distillation zone, and returning said overhead acrylonitrile product obtained to one of the zones in the distillation system preceding the zone in which substantially pure acrylonitrile is recovered overhead.

3. In the process of refining a crude acrylonitrile, produced by the reaction of acetylene and HCN, wherein said crude acrylonitrile is subjected to fractional distillation in a series of separate distillation zones to separate the various impurities therefrom and wherein substantially pure acrylonitrile is withdrawn overhead while a stream consisting essentially of acrylonitrile, lactonitrile, and cyanobutadiene is withdrawn from the bottom of one of said distillation zones, the improvement which comprises contacting said bottoms stream with water to extract acrylonitrile and lactonitrile therefrom, recovering a stream of cyanobutadiene as the organic phase from said extraction, withdrawing the aqueous solution of acrylonitrile and lactonitrile, subjecting said aqueous solution to stripping with steam in a distillation zone to obtain acrylonitrile as the overhead product and an aqueous solution of lactonitrile as the bottoms from said distillation zone, and returning said overhead acrylonitrile product obtained to one of the zones in the distillation system preceding the zone in which substantially pure acrylonitrile is recovered overhead.

References Cited in the file of this patent

| | | |
|---|---|---|
| 2,385,327 | Bradley et al. | Sept. 25, 1945 |
| 2,526,676 | Lovett | Oct. 24, 1950 |
| 2,733,259 | De Croes et al. | Jan. 31, 1956 |